Patented Oct. 15, 1940

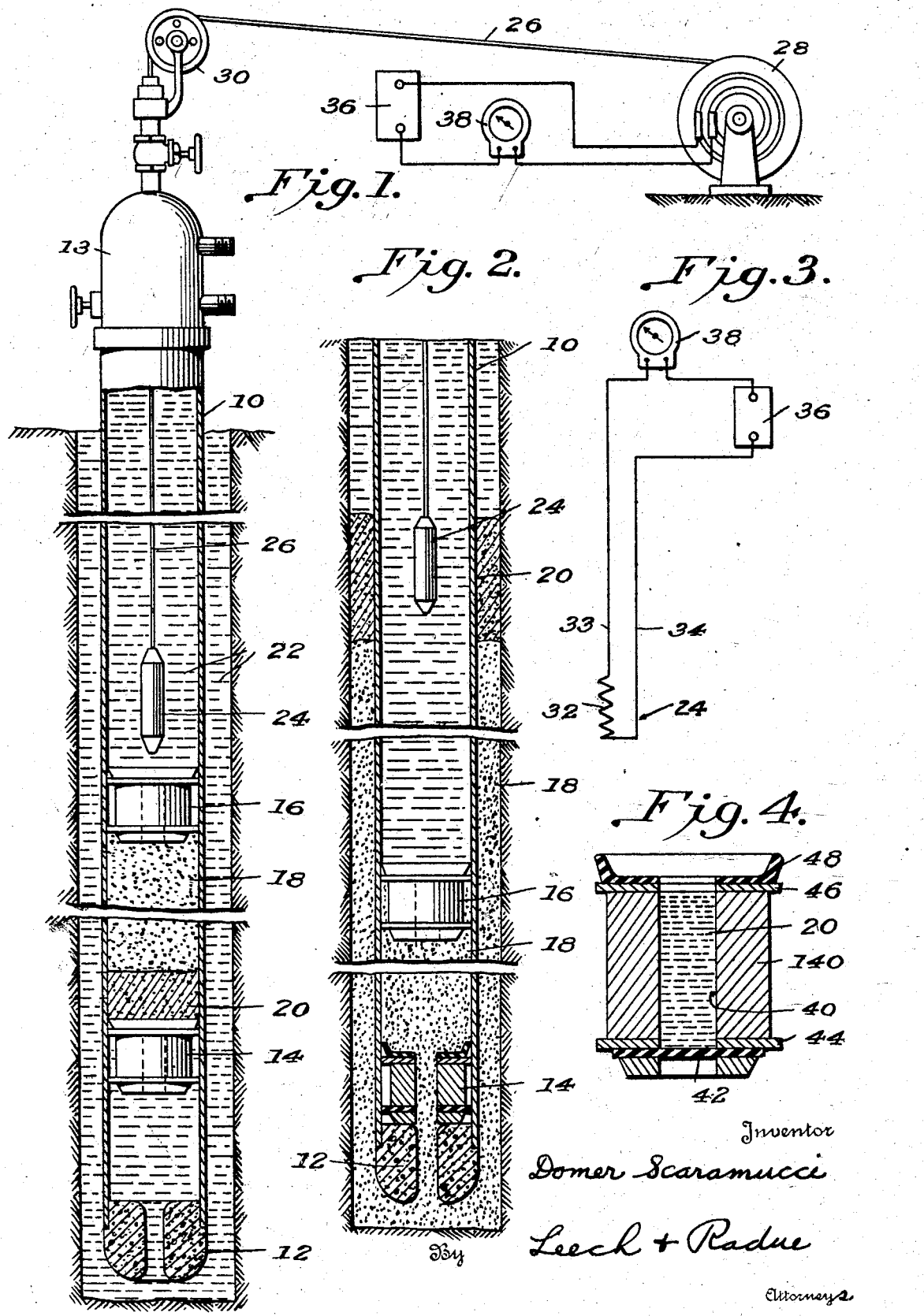

2,217,708

UNITED STATES PATENT OFFICE 2,217,708

WELL CEMENTING METHOD AND APPARATUS

Domer Scaramucci, Norman, Okla., assignor to Oil Equipment Engineering Corporation, Oklahoma City, Okla., a corporation of Oklahoma Application May 8, 1939, Serial No. 272,514

10 Claims. (Cl. 166—1)

The present invention relates to a well cementing method and apparatus for practicing such a method.

In the cementing of bore holes, such as oil wells, a tubular casing is inserted in the hole with an annular space surrounding its outside, and defined exteriorly by the formation of the drilled hole. To prevent the infiltration of water, it is customary to seal the well by forcing cement down the inside of the casing, out the bottom and up into the annular space, until it has reached the desired position, where it is permitted to set. Due to fissures, veins and other irregularities in the formation, it is difficult to predict how high the crest of a given quantity of cement will rise in the annular space surrounding the well casing. The location of this crest has been approximated by volumetric measurements, and more recently, ways have been devised for checking its position after the cement has been permitted to set and while it is still giving off heat. In the prior art method which has been indicated, a thermometric device is lowered into the casing and temperature readings are taken at regular space intervals, so that a diagram may be made of temperature versus depth of the well, and the point at which the crest of the cement is located may be determined by noting the inflection of the diagram curve. While the method just outlined is useful for determining the final position of the top of the cement lining, it does not provide any way of ascertaining the crest of an unset body of cement as it moves up the outside of the casing. If this latter observation is possible, pumping may be continued until the sealing has reached the necessary height.

In the practice of the method of this invention, an exothermic substance which is capable of emitting a relatively large quantity of heat when it reacts with the well fluid, is placed within the casing ahead of the cement, so that it will be forced downwardly therewith and rise up the outside of the casing immediately above the unset cement. Several ways are contemplated for obtaining this result. A quantity of suitable heat-emitting substance can be mixed with the first portion of the cement slurry as it is pumped into the well casing, or the chemical substance for this purpose can be carried in a lower cementing plug which precedes the cement and separates it from the well fluid in its descent down the casing. In the latter event, the heat-emitting agent will be discharged from the bottom of the casing immediately prior to the discharge of the lowermost portion of the unset cement slurry.

By the use of thermometric means within the well casing, it will be possible to locate the crest of the fluid cement by observing the marked temperature manifestation at only one point. This manifestation will occur immediately due to the vigorous action of the added heat-emitting substance.

It will be apprehended, therefore, that a general object of this invention is to provide a well cementing method in which the position of the crest of a moving body of cement can be determined accurately and controlled before the cement has begun to set.

Specifically, an object is the provision of a method in which a heat-emitting substance is added to the initial portion of the body of cement which is introduced into a well casing for sealing purposes.

A modified object is to provide a novel method of cementing which includes as a step the introduction of a separate exothermic substance into a well casing immediately ahead of a body of unset cement which is to be forced down said casing and up the outside thereof.

Among the additional objects of the invention is the provision of a method in which unset cement is forced down a well casing and up the sides into a predetermined sealing position, which position is accurately located by thermometric measurements of the thermal effect produced by an exothermic substance at the crest of the unset cement.

A further object is to provide a novel form of cementing plug which will contain a heat-emitting substance and permit it to be introduced into the annular space surrounding the well casing immediately ahead of the cement slurry as it is forced upwardly.

A more complete understanding and appreciation of the objects and details of this invention may be obtained from the following description of the preferred practice of the method and the apparatus appurtenant thereto, taken in connection with the accompanying drawing, in which—

Fig. 1 is a vertical section of an oil well which includes a casing, cementing plugs, a body of unset cement, and a temperature measuring means;

Fig. 2 is a similar section of the well, but shows the cement body in a different relative position and indicates a device for measuring the position of the temperature measuring means within the casing;

Fig. 3 is a diagrammatic representation of the temperature measuring means and the electric circuit which it involves; and Fig. 4 is an enlarged, longitudinal section of a novel cementing plug.

For an illustration of the practice of this invention, reference is now made specifically to Figs. 1 and 2 in which a continuous tubular casing 10 is inserted in a bore hole so as to provide an annular space surrounding the outside of the casing. At its lower end, the casing string 10 is provided with a guide shoe 12 of conventional form. For the purpose of cementing, a removable head and stuffing box 13 of conventional form is used. A lower cementing plug 14 and an upper cementing plug 16 are spaced by a body 18 of unset cement. As will be understood by those familiar with this art, the cement body 18 is being forced downwardly in the casing 10 by means of fluid pressure on the upper cementing plug 16. A chemical substance 20, which will react vigorously with the water-bearing well fluid 22, is inserted as a layer between the bottom of the cement body 18 and the top of the lower cementing plug 14. One substance particularly suitable for this purpose is calcium oxide which will be introduced in sufficient quantity to produce the desired thermal effect.

In Fig. 2, the downwardly moving cement body 18 has reached the bottom of the casing 10 and has flowed out through the ruptured lower plug 14 and the shoe 12 and into the annular recess, which surrounds said casing, to the height indicated. It is to be observed, that the chemical substance 20 immediately precedes the crest of the fluid cement, so as to locate its position by an active local heating action. The fluid 22 within the casing 10 will be sounded thermometrically by means of a sounding weight 24 carried by a measuring cable 26, which is fed from a measuring reel 28 over a guide pulley 30. The sounding weight 24 encases a conventional form of thermometric coil 32 such as is indicated in Fig. 3, and the measuring cable 30 comprises a pair of insulated conductors 33 and 34 leading from the coil 32 to a battery 36, which is in series with an electrical current meter 38 and said coil. A measurement of the temperature at the sounding weight 24 is obtained by the variation in resistance of the thermometric coil 32, which is shown at the meter 38. The meter 38 may be calibrated to read in degrees of temperature.

Generally, it is preferable to mix the chemical substance 20 with the first part of the cement body 18 that is pumped into the casing 10. However, Fig. 4 indicates another suitable means for placing the chemical substance at the rising crest of the cement body. The lower cementing plug 140, shown in this figure, has a large, longitudinal central bore 40 which is closed at its bottom end by a relatively thin diaphragm 42, which may be of rubber. The plug 140, which may be made of wood, has suitable sealing washers 44, 46 and 48 attached to its bottom and top in the manner shown. Before the plug 14 is placed within the casing 10, the bore 40 above the diaphragm 42 will be filled with the chemical substance 20. When the bottom plug 14 arrives at the shoe 12, the continued application of hydraulic pressure above it will cause the diaphragm 42 to rupture and discharge the heat-emitting substance 20 through the shoe 12 and up the annular recess surrounding the casing 10. Since pressure is exerted on both the descending and ascending surfaces of the cement body 18, the crest of the latter outside the casing 10 will be directly beneath and substantially in contact with the chemical substance 20.

By the present method, the crest of the fluid cement can be followed upwardly by keeping the sounding weight at a point of maximum temperature, which point will be clearly defined adjacent the heat-emitting substance 20. Alternatively, the thermometric coil 32 may be lowered to a measured position within the casing, and the arrival of the cement crest observed. It is customary to leave a substantial portion of the cement body 18 within the bottom of the casing 10 in order to permit the operator to continue forcing the cement upwardly outside of said casing until it has reached a predetermined level and to prevent dilution. After the cement has set, the portion remaining in the bottom of the casing, the cementing plugs 14 and 16, and the shoe 12 can be drilled out.

The chief advantage of the present method resides in the fact that the location of the cement can be accurately determined while it is still in a fluid state and subject to the control of an operator. By so doing, it is possible to obtain an efficient lining instead of merely checking the location of a defective one, as is the case when measurements are taken after the cement has set.

With the method of the present invention, the cementing operation becomes a single one and all need for logging, perforating, re-cementing and re-logging in the event of a cementing failure is completely eliminated. From an economic standpoint, there is a great saving in the cost of the follow-up services which have been indicated. In new fields where time is paramount, the saving due to loss in shutdown time may amount to thousands of dollars.

It might be noted, incidentally, that in obviating the need for perforating, the danger of casing damage or the possibility of leakage later on is thereby eliminated. Where the perforations are opposite a water-bearing sand, leakage is a common occurrence.

So far as is known, no comparable method has been available hitherto for successfully and efficiently cementing or sealing an oil well. That is, it has been possible only to check the cementing operation after it had been completed, and to repair it or supplement it where the need was shown by means such as thermometric logging of the well after the cement had set. Since it is the common practice in the cementing of oil wells to add a retarding agent to the cement in order that it might be pumped a considerable distance into position before any set has taken place, it will be recognized that the method herein described is peculiarly useful before any initial set of the cement, and is not dependent upon an interval of hours or days, which is necessary where the heat emitted by the cement in setting is utilized to determine the final position of the cement. In other words, mixed cement does not give off appreciable heat before the initial set period, and it is customary to delay the period of initial set in the cementing of oil wells. Ordinarily, it requires from fifteen minutes to ninety minutes for most cementing operations, i. e., mixing and pumping down the cement. In one instance, 1,500 sacks of cement were mixed and pumped down an 11,000-foot casing in fifty-two minutes. The set of the cement must, accordingly be retarded for this period at least.

Where the term "cement" is used in the foregoing specification, it is directed primarily to the various mixes of Portland cement which are used for sealing oil wells, but it is to be understood that other cements may be found equally suitable and are intended to be included. In fact, any cementing or sealing material which will flow sufficiently so that it may be forced into sealing position, and which will set or harden enough to serve as an efficient seal, may be used.

What I claim as new and desire to secure by Letters Patent of the United States is:

1. A method of cementing oil wells which includes as a step the introduction of an exothermic substance ahead of the cement in order that the position thereof may be determined before appreciable set of the cement has taken place.

2. A method of cementing wells which includes forcing a heat-liberating substance down the well adjacent the bottom of a body of cement, and utilizing the heat manifestation of the substance to determine the position of the cement before it has set.

3. The method of lining a bore hole with a sealing agent such as cement, comprising, introducing a casing string into the bore hole so as to provide an annular space between it and the surface of the bore hole, inserting in the casing a substance which will liberate heat vigorously when it reacts with the fluid in the bore hole, forcing the sealing agent upwardly into said space immediately behind the heat-liberating substance, and locating the crest of the sealing agent before it hardens by measuring the temperature in the casing adjacent the heat-liberating substance.

4. The method of cementing wells comprising inserting a substance in a well casing which will produce a vigorous exothermic effect when it reacts with a water-bearing fluid in the well, forcing a body of unset cement down the casing adjacent the exothermic substance until it passes through an opening in the casing and rises to sealing position in the annular space between the casing and the formation, locating the crest of the cement by measuring the temperature within the casing adjacent the exothermic substance which precedes the unset cement, and stopping the movement of the unset cement when its crest has reached a desired elevation.

5. The method of cementing wells comprising mixing with a small portion of unset cement a substance which will produce a vigorous exothermic effect when it reacts with a water-bearing fluid in the well, inserting the thus mixed substance and cement in a well casing, inserting a large portion of unset cement in the casing behind the small portion, forcing the whole body of unset cement down the casing until it passes out through an opening in the said casing and rises to sealing position in the annular space between the casing and the formation, locating the crest of the cement by measuring the temperature within the casing adjacent the exothermic substance which precedes the unset cement, and stopping the movement of the unset cement when its crest has reached a desired elevation.

6. An improved method of cementing oil wells comprising introducing into a casing string in advance of a main body of cement slurry a substance which will react vigorously with the well fluid to produce a distinct exothermic effect, forcing said substance and cement slurry down the casing string and upwardly into the well bore space surrounding said casing, and following the crest of the upwardly rising cement slurry to its desired position by measuring the temperature within the casing opposite the exothermic substance.

7. The method of lining a bore hole with cement, comprising, introducing a tubular casing into the bore hole so as to provide an annular space between it and the surface of the bore hole, inserting in the casing a lower cementing plug containing a substance which will liberate heat vigorously when it reacts with the fluid in the bore hole, releasing the heat-liberating substance from the plug when it reaches an opening in the casing, forcing cement upwardly into said space immediately behind the heat-liberating substance, and locating the crest of the cement before it sets by measuring the temperature inside the casing adjacent the heat-liberating substance.

8. A cementing plug for oil wells comprising a frangible body member, said body member having a longitudinal bore therein, well casing sealing means secured to the top and bottom of said body member, and a thin diaphragm covering the lower end of the bore in the body member so as to provide a chamber therein which is open on the topside only.

9. A cementing plug for oil wells comprising a frangible body member, said body member having a longitudinal bore therein, well casing sealing means secured to the said body member, and a thin rubber diaphragm covering the lower end of the bore in the body member so as to provide a chamber therein which is open on the topside only.

10. A cementing plug for oil wells comprising a frangible body member, said body member having a longitudinal bore therein, well casing sealing means secured to the said body member, a thin rupturable diaphragm covering the lower end of the bore in the body member so as to provide a chamber therein which is open on the topside only, and within the chamber a chemical substance which will liberate heat vigorously when mixed with well fluid upon rupture of the diaphragm.

DOMER SCARAMUCCI.